US011163861B2

(12) United States Patent
Poddar et al.

(10) Patent No.: US 11,163,861 B2
(45) Date of Patent: Nov. 2, 2021

(54) MACHINE LEARNING MODEL WITH WATERMARKED WEIGHTS

(71) Applicant: TEXAS INSTRUMENTS INCORPORATED, Dallas, TX (US)

(72) Inventors: Deepak Kumar Poddar, Bangalore (IN); Mihir Mody, Bangalore (IN); Veeramanikandan Raju, Bangalore (IN); Jason A. T. Jones, Richmond, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 157 days.

(21) Appl. No.: 16/188,560

(22) Filed: Nov. 13, 2018

(65) Prior Publication Data

US 2019/0205508 A1    Jul. 4, 2019

Related U.S. Application Data

(60) Provisional application No. 62/612,274, filed on Dec. 29, 2017.

(51) Int. Cl.
| | | |
|---|---|---|
| G06F 21/00 | (2013.01) | |
| G06F 21/16 | (2013.01) | |
| G06N 3/04 | (2006.01) | |
| G06N 20/00 | (2019.01) | |
| G06F 21/12 | (2013.01) | |

(52) U.S. Cl.
CPC ............ *G06F 21/16* (2013.01); *G06F 21/121* (2013.01); *G06N 3/0472* (2013.01); *G06N 20/00* (2019.01)

(58) Field of Classification Search
CPC ................................ G06F 21/16; G06N 20/00
USPC ........................................................ 713/176
See application file for complete search history.

(56) References Cited

U.S. PATENT DOCUMENTS

| | | | | |
|---|---|---|---|---|
| 6,888,943 | B1 * | 5/2005 | Lam .......................... | H04K 1/00 327/371 |
| 2006/0277410 | A1 * | 12/2006 | Jajodia ...................... | H04L 9/12 713/176 |
| 2016/0358614 | A1 * | 12/2016 | Phielipp ................... | G10L 15/22 |
| 2018/0341851 | A1 * | 11/2018 | Chung ..................... | G06N 3/082 |
| 2019/0158338 | A1 * | 5/2019 | Herath ..................... | H04L 5/003 |
| 2019/0171911 | A1 * | 6/2019 | Greenberg ............... | G06N 3/04 |

* cited by examiner

*Primary Examiner* — Anthony D Brown
(74) *Attorney, Agent, or Firm* — Ebby Abraham; Charles A. Brill; Frank D. Cimino

(57) ABSTRACT

In some examples, a system includes storage storing a machine learning model, wherein the machine learning model comprises a plurality of layers comprising multiple weights. The system also includes a processing unit coupled to the storage and operable to group the weights in each layer into a plurality of partitions; determine a number of least significant bits to be used for watermarking in each of the plurality of partitions; insert one or more watermark bits into the determined least significant bits for each of the plurality of partitions; and scramble one or more of the weight bits to produce watermarked and scrambled weights. The system also includes an output device to provide the watermarked and scrambled weights to another device.

22 Claims, 4 Drawing Sheets

MACHINE LEARNING MODEL WITH WATERMARKED WEIGHTS

CROSS-REFERENCE TO RELATED APPLICATIONS

The present application claims priority to U.S. Provisional Patent Application No. 62/612,274, which was filed Dec. 29, 2017, is titled "Machine Learning Model With Watermarked Weights," and is hereby incorporated herein by reference in its entirety.

BACKGROUND

Machine learning is an application of artificial intelligence that provides systems the ability to learn and improve from experiences without being explicitly programmed. Machine learning systems are probabilistic systems, in contrast to traditional von Neumann computers, which are deterministic in nature.

SUMMARY

In an example, a system includes storage storing a machine learning model, wherein the machine learning model comprises a plurality of layers comprising multiple weights. The system also includes a processing unit coupled to the storage and operable to group the weights in each layer into a plurality of partitions; determine a number of least significant bits to be used for watermarking in each of the plurality of partitions; insert one or more watermark bits into the determined least significant bits for each of the plurality of partitions; and scramble one or more of the weight bits to produce watermarked and scrambled weights. The system also includes an output device to provide the watermarked and scrambled weights to another device.

In another example, a system includes storage operable to store watermarked and scrambled weights of a machine learning model, wherein the watermarked and scrambled weights comprise a plurality of layers. The system also includes a processor coupled to the storage and operable to obtain the watermarked and scrambled weights; for at least one of the plurality of layers, obtain a number of partitions and a number of least significant bits used for watermarking; obtain a test signature from the watermarked and scrambled weights based on the number of partitions and the number of least significant bits. The processor is also operable to receive a watermark signature; compare the test signature to the watermark signature; compute a confidence score based on the comparison; compare the confidence score against a threshold, wherein the confidence score exceeding the threshold indicates a match between the test signature and the watermark signature; unscramble the watermarked and scrambled weights in response to the confidence score exceeding the threshold; and use the unscrambled weights.

In yet another example, a method includes providing a machine learning model comprising a plurality of layers, each of the plurality of layers comprising weights that are watermarked and scrambled. The method also includes selecting at least one of the plurality of layers. The method further includes grouping the weights in each of the plurality of layers based on a number of partitions to form a plurality of partitions. The method also includes obtaining watermark bits from each of the plurality of partitions based on a number of least significant bits used for watermarking. The method then includes concatenating the obtained watermark bits to form a test signature. The method further includes obtaining a watermark signature. The method then includes comparing the test signature and the watermark signature. The method then includes computing a confidence score based on the comparison. The method further includes comparing the confidence score against a threshold. The method further includes unscrambling the weights in response to the confidence score exceeding the threshold. The method then includes refraining from unscrambling the weights in response to the confidence score falling below the threshold. The method also includes providing the weights to another device configured to make predictions using the machine learning model and the weights.

BRIEF DESCRIPTION OF THE DRAWINGS

For a detailed description of various examples, reference will now be made to the accompanying drawings in which.

DETAILED DESCRIPTION

Figure 1:
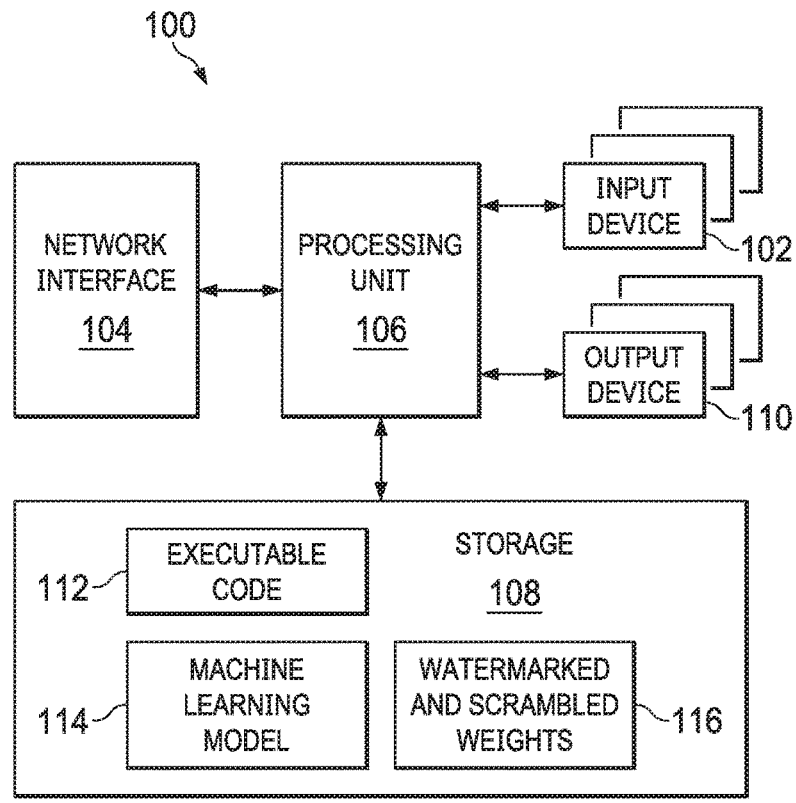
FIG. 1 is a block diagram of an illustrative system in accordance with various examples.

Deep learning has improved in a wide range of areas, e.g., speech recognition, image processing and pattern recognition. Deep learning architectures include feed-forward deep neural networks (DNN), recurrent networks (RNN), convolution neural networks (CNN), long/short-term memory cells (LSTM), and combinations thereof. Deep learning involves "training" a machine with large amounts of data and algorithms, which gives it the ability to learn how to perform tasks. For example, CNN-based machine learning is a class of deep, feed-forward artificial neural networks, inspired by the mammalian visual system, used for pattern recognition, object detection, and image processing.

The development of a machine learning model includes two phases: first, a training phase, and second, a testing phase. The training phase involves determining a set of weights for a particular machine learning model. The determination of weights is a time-consuming and expensive task. Due to the cost and difficulty of determining weights during the training process, the weights are valuable. As such, the weights are susceptible to theft and should be protected from unauthorized alteration or use.

Accordingly, described herein are various examples of systems and methods for protecting machine learning weights from theft or unauthorized alteration. At least some examples are directed to the modification of weights of the machine learning model to protect against theft or alteration by unauthorized users. Disclosed techniques include the scrambling of weight bits to render the weights useless unless and until watermarks embedded in the weights are unlocked with a watermark key, at which point the weight bits are unscrambled and can be used in a machine learning context as desired.

As mentioned above, the techniques described herein include training and testing phases. Consider a set of weights that are to be protected. During the training phase, subsets of these weights are scrambled to decrease the accuracy of the machine learning model. In addition, a watermark—which is a specific sequence or group of bits—is inserted into specific bit locations in the set of weights. This watermark acts as a "lock." In this watermarked and scrambled state, the set of weights is protected from unauthorized use. During the testing phase, a particular user or computer may wish to use the watermarked, scrambled set of weights in a machine learning system. To do so, however, that system must have access to a watermark signature, which acts as a key to unlock the watermark in the set of weights. Stated another way, the watermark signature is used to verify that the set of weights is being accessed by an authorized user. Assuming the watermark signature matches the watermark, the weight bits are unscrambled, and they are then usable by the authorized user in the machine learning system. These and other examples are now described in detail with particular reference to the drawings. The description below is intended to apply to CNN weights, although all types of machine learning model weighting systems are contemplated.

FIG. 1 is a block diagram of an illustrative system 100 in accordance with various examples. The system 100 is, for example, a machine learning system. In some examples, the system 100 includes one or more input devices 102 (e.g., keyboards, microphones, mice, touchscreens); a network interface 104 (e.g., a transceiver, or a network card to communicate with the Internet or a local area network); a processing unit 106; storage 108 (e.g., random access memory (RAM)); one or more output devices 110 (e.g., displays, audio speakers); executable code 112, which, when executed by the processing unit 106, causes the processing unit 106 to perform some or all of the actions attributed herein to the system 100; a machine learning model 114; and watermarked and scrambled weights (i.e., weight bits) 116. Other hardware or software/firmware components may be included besides those expressly depicted in FIG. 1. The system 100 can perform the training and testing phases mentioned above. The manner in which the system 100 performs the training phase is now described with respect to FIGS. 1, 2, 3, and 4, and the manner in which the system 100 performs the testing phase is subsequently described with respect to FIGS. 1 and 5.

Figure 2:
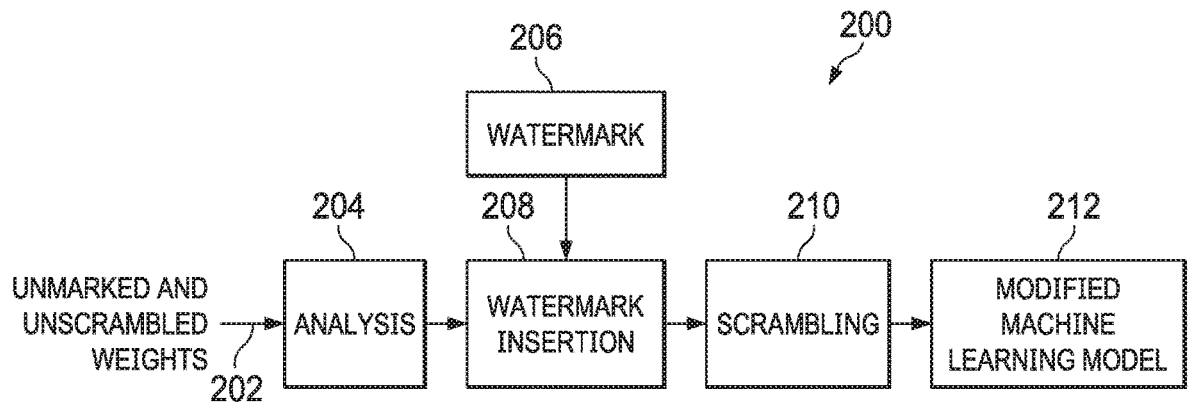
FIG. 2 is a conceptual flow diagram of a watermarking and scrambling technique in accordance with various examples.

FIG. 2 is a conceptual flow diagram 200 of an illustrative watermarking and scrambling technique in accordance with various examples. This technique is performed by the system 100, and, more particularly, by the processing unit 106 upon execution of the executable code 112. Referring to FIGS. 1 and 2, the processing unit 106 first retrieves unmarked and unscrambled weights 202 from the machine learning model 114. In some examples, the unmarked and unscrambled weights 202 are stored separately from the machine learning model 114—for example, in the storage 108 or in another storage not expressly depicted in the drawings.

Figure 3:
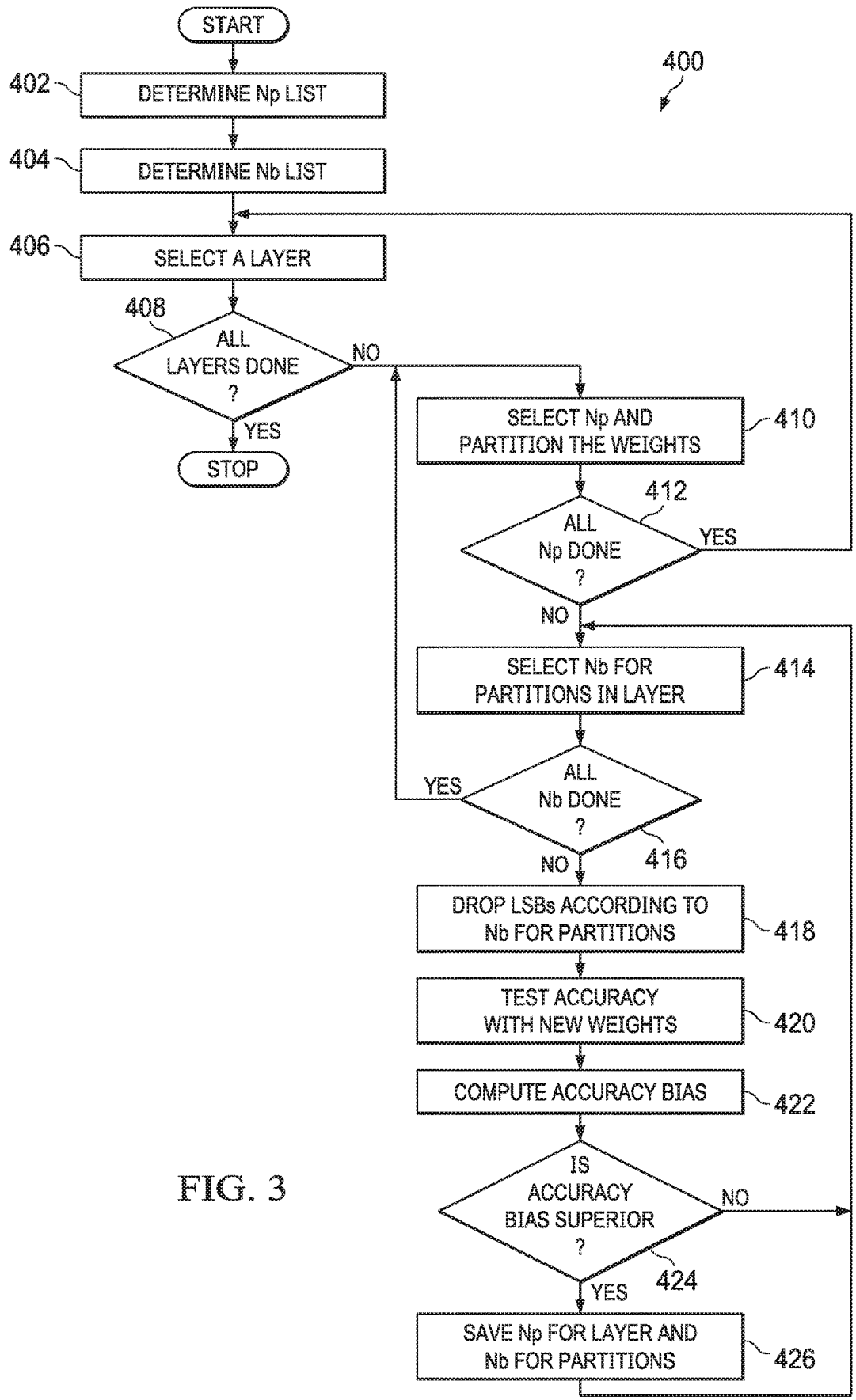
FIGS. 3-5 are flow diagrams of watermarking and watermarking detection techniques, in accordance with various examples.

Upon obtaining the unmarked and unscrambled weights 202, the processing unit 106 analyzes the unmarked and unscrambled weights 202, as indicated by numeral 204 in FIG. 2. In particular, the processing unit 106 analyzes the unmarked and unscrambled weights 202 to determine which of the weight bits are most suited to watermarking—that is, which bits, if watermarked, would have no impact on the accuracy with which the weights can be used, or which bits, if watermarked, would have an impact on the accuracy within a tolerable range. FIG. 3 describes this process of identifying the weight bits most suited to watermarking, and it is described after providing a description of the architecture of weights.

Machine learning models are organized into multiple layers, with each layer including a plurality of weights. In addition, the weights of each layer are grouped into partitions. Thus, for example, an illustrative machine learning model may include ten layers, with each layer having two partitions, and each partition comprising multiple weights, where each weight includes, e.g., eight bits. Within each partition, the bits of each weight are organized from least significant to most significant. Thus, for instance, in a weight with eight bits, bit 7 would be the least significant bit, and bit 0 would be the most significant bit.

FIG. 3 is a flow diagram of a method 400 for identifying weight bits in a machine learning model that are most suited to watermarking, in accordance with various examples. More particularly, the method 400 is directed to identifying an overall watermarking scheme for the weights in a machine learning model. In some examples, the processing unit 106 performs the method 400. Step 402 is directed to determining how many partitions should be in each layer to produce the most effective watermarking scheme for the weights. It is possible, for example, that having only two partitions in each layer comprising weights will produce a more effective watermarking scheme than having four partitions in each layer, and vice versa. Thus, step 402 includes determining a list of numbers, where each number specifies a potential number of partitions of the weights in each layer to be protected. For example, performing step 402 may produce a list [1, 2, 4, 8], meaning that the effectiveness of watermarking schemes is to be determined for weights of just one partition in each layer; that have two partitions in each layer; that have four partitions in the layer; and that have eight partitions in the layer. For purposes of this description, the number of partitions used to group weights in a layer is termed "Np." Further, for purposes of this description, an Np list of [1, 2, 4, 8] will be assumed, although virtually any Np list is possible.

Step 404 is similar in some respects to step 402. In particular, step 404 is directed to determining how many bits of the weights in each partition should be used for watermarking purposes. Similar to step 402, in step 404, different numbers of watermarking bits per partition can produce different outcomes in terms of watermarking effectiveness. For example, using only one bit per weight in a given partition for watermarking purposes may be less effective than using two bits. Thus, in step 404, the processing unit 106 determines a list of numbers, where each number indicates how many bits per partition should be dedicated to watermarking purposes. For example, such a list may be [1, 2], where "1" signifies that only one bit per weight in a given partition should be used for watermarking, and where "2" signifies that two bits per weight in a given partition should be used for watermarking. For purposes of this description, the number of bits used for watermarking per partition is termed "Nb." Further, for purposes of this description, an Nb list of [1, 2] will be assumed.

Step 406 begins the analysis of the weights for watermarking purposes. In particular, step 406 entails selecting a layer from among the plurality of layers to be protected. As this step indicates, the steps 408 through 426 are performed separately for each layer. Assuming not all layers have been selected in step 406 (step 408), the method 400 comprises selecting a value of Np from the list developed in step 402 and partitioning the weights accordingly (step 410). For example, if there are ten layers, the first layer will be selected in step 406 and from the Np list [1, 2, 4, 8], the first Np—that is, 1—will be selected in step 410. An Np of 1 means that the first layer should have one partition, so the weights of the first layer selected in step 406 will be grouped into a single partition. Were an Np of 2 selected, the weights of the first layer selected in step 406 would be grouped into two partitions, and so on. The remainder of this description assumes that an Np of 8 is selected.

Assuming not all Nps in the Np list have been implemented (step 412), the method 400 comprises selecting an Nb value to be tested for one or more of the partitions in the selected layer (step 414). Assuming not all Nb values in the list developed at step 404 have been exhausted (step 416), the method 400 comprises dropping the least significant bits (LSBs) based on the selected value of Nb across all of the partitions in the selected layer (step 418). By "dropping," it is meant that null watermark bits are inserted into the two LSBs of each weight in each partition of the selected layer. Null watermark bits are a set of bits (e.g., 0, 0) that are used in each iteration of the method 400 to produce an "apples-to-apples" comparison of the effectiveness of different watermarking schemes. Dropping the LSBs by inserting null watermark bits in the weights results in new weights.

In step 420, the accuracy of the new weights in the machine learning model context is determined using the machine learning model using conventional techniques. In step 422, the accuracy bias caused by dropping the LSBs (step 418) is determined. In some examples, the accuracy bias is determined as:

$$\text{Accuracy bias} = \text{Test accuracy} - \text{Real\_total\_bits} * \left(\frac{0.03}{\text{Total\_bits}}\right)$$

where Test accuracy is the accuracy computed using the new weights (step 420); Real_total_bits is the total number of weight bits in the layer in question excluding the bits reserved for Nb for each partition in the layer; and Total_bits is the total number of weight bits in the layer in question including the bits reserved for Nb for each of partition in the layer.

The method 400 iteratively analyzes the accuracy bias calculated for each combination of Np and Nb from the lists developed in steps 402 and 404 to determine which combination of Np and Nb produces the best accuracy bias for the layer selected in step 406. More specifically, the processing unit 106 iteratively performs the steps 410-424 (and, in some cases, 426) for each combination of Np and Nb for the layer selected in step 406. The processing unit 106 maintains a running record (e.g., in a register or in storage 108) of the combination of Np and Nb that produces the best accuracy bias value in step 422 (steps 424 and 426). If a particular combination of Np and Nb produces a better accuracy bias value than that stored in the running record, then that combination of Np and Nb overwrites the currently stored combination of Np and Nb. When all combinations of Np and Nb have been tested for a particular layer, the combination of Np and Nb currently stored in the running record will be the combination that produces the best accuracy bias value. The process is then repeated for the remaining layers (steps 406 and 408). The product of the method 400 is a specific combination of Np and Nb for each layer in the machine learning model. Each such combination may be stored in the metadata associated with each layer of the machine learning model.

The method 400 as depicted in FIG. 3 comprises evaluating Np and Nb combinations for all partitions at a single time—e.g., in parallel. This results in a single value of Nb that applies to all partitions in a layer. However, in some examples, combinations of Np and Nb may be evaluated for each partition serially—that is, one at a time. In such examples, for a particular layer, a particular value of Np is selected from the list developed in step 402, and for each value of Np, a different value of Nb is selected from the list developed in step 404, and for each value of Nb, an accuracy bias is computed for each partition. In this way, the combination of Np and Nb that produces the best accuracy bias value is determined for each partition in a layer, rather than for all partitions in a layer at one time. This may result in different values of Nb for each partition in a layer, and it may alternatively result in the same values of Nb for each layer. The product of this variation on method 400 is a specific combination of Np and Nb for each partition in each layer of the machine learning model. Each such combination may be stored in the metadata associated with each layer of the machine learning model.

Figure 4:
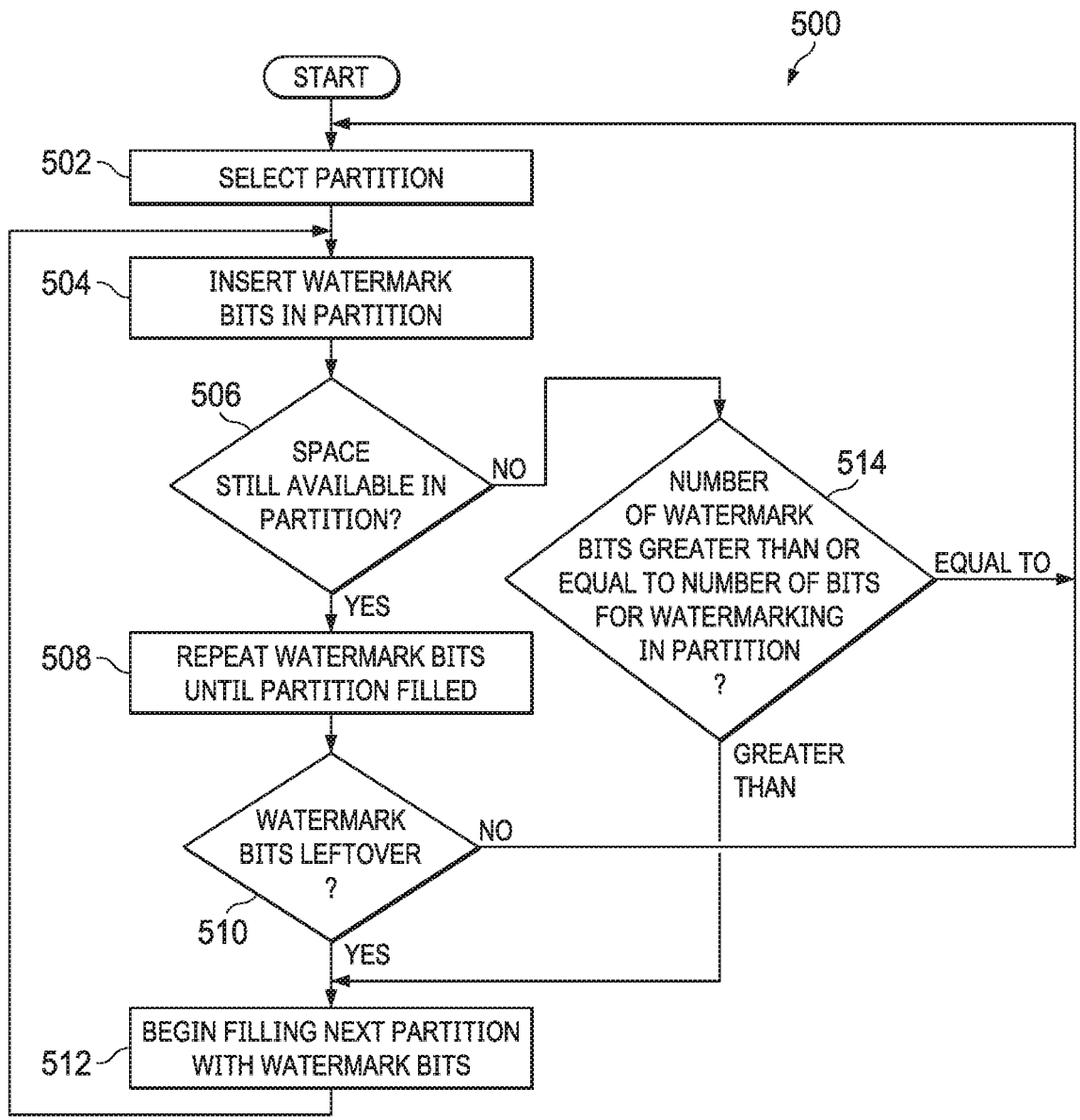

Referring again to FIG. 2, after the analysis 204 is complete, a watermark 206 is inserted into the weight bits, as indicated by numeral 208. A watermark, which is a series of bits that is kept confidential, may be generated by any suitable entity—for example, a designer of the system 100 or a user of the system 100. In some examples, the number of watermark bits is less than or equal to the total number of bits dedicated to watermarking as determined in the method 400. FIG. 4 includes a flow diagram of a watermarking insertion method 500, which is now described.

The method 500, which may be performed by the processing unit 106, begins with selecting a partition (step 502) and inserting the watermark bits of the watermark 206 in the partition (step 504). The partition selected in step 502 may be, for example, the first partition of the first layer in the machine learning model. The method 500 then determines whether space for additional watermark bits still remains in the partition after step 504 (step 506). Step 506 is performed because the number of bits in the watermark may not exactly match the number of bits available for watermarking in the partition. For example, the number of bits in the watermark may be more than or less than the number of bits available for watermarking in the partition. The remaining steps of the method 500 address the varying possibilities in this regard. If, for example, it is determined in step 506 that there is still space available in the partition for watermark bits, then this means that the number of watermark bits is less than the number of bits allocated for watermarking in the current partition. Thus, the watermark bits are repeated until the partition is filled (step 508). The method 500 then comprises determining whether there are any watermark bits left over (step 510). For example, if the number of bits allocated for watermarking in the partition is 2048, and if there are 1024 bits in the watermark, then after step 510 is performed, no watermark bits will be left over, since 2048 is a multiple of 1024. In contrast, for example, if the number of bits allocated for watermarking in the partition is 2048, and if there are 1025 bits in the watermark, then after step 510 is performed, watermark bits will remain, since 2048 is not a multiple of 1025 (i.e., the watermark will be inserted into the partition once, leaving 2048−1025=1023 bits allocated to watermarking that are still available, and if the watermark is inserted in those remaining 1023 bits, 2 bits of the watermark will be left over). If the determination of step 510 is that no watermark bits are left over, control of the method 500 reverts to step 502. However, if the determination of step 510 is that watermark bits are left over, then the method 500 comprises filling the next available partition with the remaining watermark bits, and then reverting control of the method 500 to step 504.

If, at step 506, it is determined that there are not still available bits allocated for watermarking in the partition, the method 500 comprises determining whether the number of watermark bits is greater than or equal to the number of bits allocated for watermarking in the partition (step 514). If the number of watermark bits is equal to the number of bits allocated for watermarking in the partition, this means that there are no watermark bits left over, and it also means that there are no bits allocated for watermarking left over. Thus, control of the method 500 reverts to step 502. However, if the number of watermark bits is greater than the number of bits allocated for watermarking in the partition (step 514), the method 500 comprises filling the next available partition with the remaining watermark bits (step 512), after which control of the method 500 reverts to step 504.

The iterative nature of the method 500 as depicted in FIG. 4 and as described above assumes that additional partitions are available with each iteration. If the final partition of a layer is filled and has no bits available that are allocated for watermarking, then the next watermark bits to be inserted into the weights are inserted into the first partition of the next available layer. If all partitions of all layers are filled, the process of FIG. 4 stops, regardless of whether or not there are additional watermarking bits that remain.

Referring again to FIG. 2, after the watermark has been inserted into the weights (numeral 208), some of the bits in the weights are scrambled (numeral 210). Bit scrambling may be performed as desired. In some examples, any number of bits is scrambled, as long as the watermark bits are not scrambled. In some examples, two bits are scrambled. In some examples, the bits that are scrambled are those that cause the weights, when used in the machine learning model, to produce inaccurate results. Thus, in some examples, the scrambling process includes an iterative trial-and-error process that produces scrambled weights that, if used in a machine learning model, would produce inaccuracies. However, in other examples, a technique such as the linear-feedback shift register (LFSR) technique is used to identify the bit or bits that, if scrambled, would produce the inaccurate results. Scrambling bits in the weights in this manner without altering the watermark bits produces a modified machine learning model (numeral 212). The training phase is then complete.

As explained above, after the weights of the machine learning model are watermarked and scrambled in the training phase, the weights may be securely stored or transferred as desired, with the risk of unauthorized use being mitigated due to the presence of the watermarked and scrambled weights. A user may subsequently wish to use the weights in a machine learning model. The process of authenticating the user and granting or denying the user access to the unscrambled weights is known as the testing phase. The testing phase is now described with reference to FIG. 5.

Figure 5:
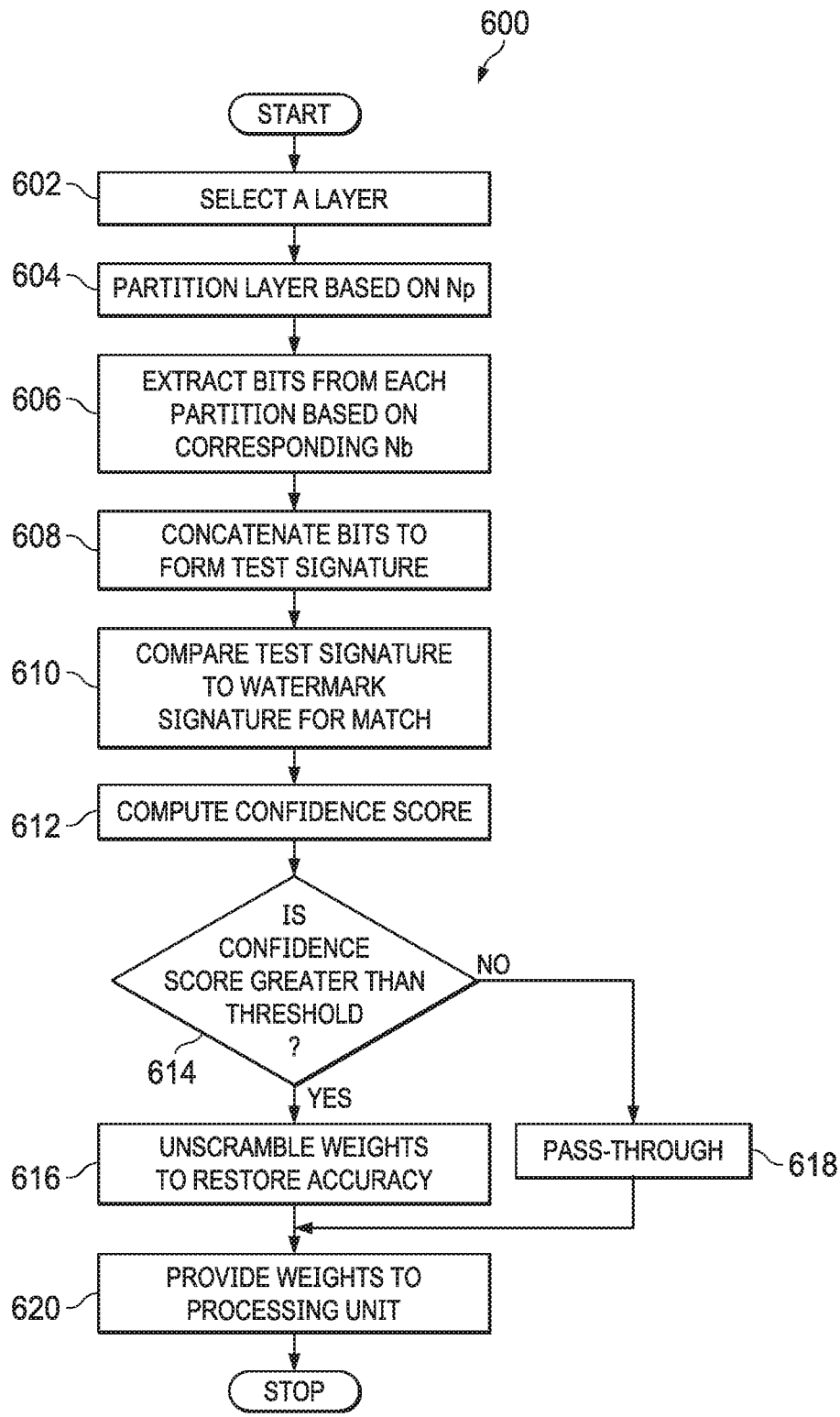

FIG. 5 depicts a flow diagram of an illustrative method 600 in accordance with various examples. In some examples, the processing unit 106 performs the method 600. The method 600 comprises selecting a layer in the modified machine learning model (step 602) and partitioning the layer using the value of Np (step 604). The values of Np and Nb for each layer, in some examples, are stored as metadata associated with the layer. In some examples, the values of Np and Nb are stored elsewhere independently of the layer. After the selected layer has been partitioned using the value of Np, watermark bits are identified and copied from each partition of the selected layer using Nb (step 606). For example, in a layer with three partitions and with an Nb value of two, the two LSBs in each of the partitions of the selected layer are identified and copied. The copied watermark bits are subsequently concatenated to form a test signature (step 608). Because it can be used to unscramble the scrambled weight, the test signature is kept confidential and is not revealed to the user.

The method 600 also comprises comparing the test signature of step 608 to a watermark signature received from, e.g., a user of the device (step 610). The test signature acts as a lock, and the watermark signature acts as a key. In some examples, the watermark signature is dynamically programmable into the system 100 (e.g., using eFuse technology). In some examples, the watermark signature is stored in read-only memory (ROM) and is not dynamically altered. In some examples, the comparison includes comparing the test signature to the watermark signature bit-by-bit. The comparison produces a confidence score (step 612), which, in some examples, indicates how well the test and watermark signatures match each other (e.g., the total number of times the bits in the signatures matched divided by the total number of possible bit matches). In some examples, if the confidence score exceeds a programmed threshold value (step 614) (e.g., 0.90), the system unscrambles the weights (step 616), and the unscrambled weights are provided to the processing unit for further use (e.g., performing predictions in the context of a machine learning model). The processing unit is programmed to unscramble the weights—for example, it is programmed directly, or it receives unscrambling instructions from another device that scrambled the weights. In some examples, if the confidence score falls below the programmed threshold, or if the confidence score merely meets the programmed threshold, the method 600 comprises rejecting the unauthorized attempt to unscramble the weights (step 618), and the weights remain scrambled and unusable.

In some examples, the weights may not include watermark bits. In such a case, the processing unit will detect that metadata pertaining to Np and Nb values has not been received and, thus, there are no watermark bits in the weights. As a result, in some examples, the processing unit will treat the weights as if there were a mismatch between the watermark signature and a test signature, meaning that it will not unscramble the scrambled bits in the weights. Thus, in some examples, the weights remain unusable if it has not been watermarked. In addition, in some cases, the system attempting to use scrambled weights may not be programmed with the algorithm necessary to unscramble the weights. In this situation, regardless of whether the weights are watermarked and whether the system has the watermark signature, the system will be unable to benefit from the proprietary, scrambled weights.

While preferred examples have been shown and described, modifications thereof can be made by one skilled in the art without departing from the scopes or teachings herein. The examples described herein are not limiting in scope. For instance, one could potentially have the training of the machine learning model for watermark insertion and testing of the modified machine learning model for watermark signature matching in the cloud by the method described above.

In the foregoing discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

The above discussion is meant to be illustrative of the principles and various examples of the present disclosure. Numerous variations and modifications will become apparent to those skilled in the art once the above disclosure is fully appreciated. It is intended that the following claims be interpreted to embrace all such variations and modifications.

What is claimed is:

1. A system comprising:
   a processing unit;
   a memory storing software instructions that, when executed by the processing unit, cause the processing unit to:
   receive a machine learning model comprising a plurality of layers, respective ones of the layers comprising multiple weights;
   determine an accuracy bias for each of multiple different sets of possible values for Np and Nb, wherein an Np of a respective layer is a number of partitions into which to group the weights in the respective layer, and an Nb of a respective partition is a number of least significant bits (LSBs) of the respective partition to be used for watermarking;
   determine an Np for each of the layers and an Nb for each of the partitions in response to the determined accuracy biases;
   insert one or more watermark bits into the Nb LSBs of the weights in each of the Np respective partitions in each of the respective layers; and
   scramble one or more of the weight bits to produce watermarked and scrambled weights; and
   an output device configured to provide the watermarked and scrambled weights to another device.

2. The system of claim 1,
   wherein the processing unit is configured to copy the one or more watermark bits from the watermarked and scrambled weights and to concatenate the copied one or more watermark bits; and
   wherein the processing unit is configured to compare the concatenated watermark bits with a watermark signature, and wherein the processing unit is configured to unscramble the one or more of the weight bits in response to the comparison.

3. The system of claim 1, wherein the accuracy bias for a set of possible values for Np and Nb is determined in response to total numbers of weight bits in respective ones of the layers, the possible set of values for Np and Nb for the respective layers, and an accuracy of the machine learning model in which:
   the insert watermark bits action is performed using the possible set of values for Np and Nb, and
   the scramble action is performed.

4. The system of claim 1, wherein the accuracy bias is obtained using the expression:

$$\text{Accuracy bias} = \text{Test accuracy} - \text{Real\_total\_bits} * \left( \frac{0.03}{\text{Total\_bits}} \right)$$

wherein Test accuracy is a value indicating the accuracy of the machine learning model using the watermarked and scrambled weights; Real_total_bits is a total number of weight bits in the layer, excluding bits reserved for the one or more watermark bits for each of the partitions in the layer; and Total_bits is a total number of weight bits in the layer including the bits reserved for the one or more watermark bits for each of the partitions in the layer.

5. The system of claim 1, wherein the processing unit is configured to store values of Np and Nb in metadata corresponding to respective ones of the layers.

6. The system of claim 1, wherein the processing unit is configured to insert multiple instances of at least one of the one or more watermark bits into the Nb LSBs for each of the respective partitions.

7. The system of claim 1, wherein the processing unit uses null watermarking to determine the number of LSBs to be used for watermarking in each of the partitions.

8. The system of claim 1, wherein the one or more scrambled weight bits are different than the Np LSBs.

9. The system of claim 1, wherein, to scramble the one or more of the weight bits, the software instructions, when executed by the processing unit, cause the processing unit to:
   identify a plurality of scrambling schemes that reduce accuracy of the machine learning model; and
   identify the scrambling scheme among the plurality of scrambling schemes that degrades accuracy of the machine learning model more than the remaining scrambling schemes in the plurality of scrambling schemes.

10. A system comprising:
    storage operable to store watermarked and scrambled weights of a machine learning model, wherein the watermarked and scrambled weights comprise a plurality of layers; and
    a processor coupled to the storage and operable to:
    obtain the watermarked and scrambled weights;
    for at least one of the plurality of layers, obtain a number of partitions and a number of least significant bits used for watermarking;
    obtain a test signature from the watermarked and scrambled weights based on the number of partitions and the number of least significant bits;
    receive a watermark signature;
    compare the test signature to the watermark signature;
    compute a confidence score based on the comparison;
    compare the confidence score against a threshold, wherein the confidence score exceeding the threshold indicates a match between the test signature and the watermark signature;
    unscramble the watermarked and scrambled weights in response to the confidence score exceeding the threshold; and
    use the unscrambled weights.

11. The system of claim 10, wherein the processor is configured to obtain watermark bits from the at least one of the plurality of layers based on the number of partitions and the number of least significant bits.

12. The system of claim 11, wherein the processor is configured to obtain the test signature by concatenating the watermark bits.

13. The system of claim 10, wherein the number of partitions and the number of least significant bits are stored in metadata associated with the watermarked and scrambled weights.

14. A method comprising:
    providing a machine learning model comprising a plurality of layers, each of the plurality of layers comprising weights that are watermarked and scrambled;
    selecting at least one of the plurality of layers;
    grouping the weights in each of the plurality of layers based on a number of partitions to form a plurality of partitions;

obtaining watermark bits from each of the plurality of partitions based on a number of least significant bits used for watermarking;
concatenating the obtained watermark bits to form a test signature;
obtaining a watermark signature;
comparing the test signature and the watermark signature;
computing a confidence score based on the comparison;
comparing the confidence score against a threshold;
unscrambling the weights in response to the confidence score exceeding the threshold;
refraining from unscrambling the weights in response to the confidence score falling below the threshold; and
providing the weights to another device configured to make predictions using the machine learning model and the weights.

15. The method of claim 14, wherein the weights in unscrambled form enable the machine learning model to provide results with greater accuracy than do the weights in scrambled form.

16. The method of claim 14, wherein the confidence score is based on a frequency with which bits in the test signature match bits in the watermark signature.

17. The method of claim 14, wherein the number of partitions and the number of least significant bits used for watermarking are stored in metadata associated with the layers.

18. The method of claim 14, wherein the confidence score exceeding the threshold indicates a match between the test signature and the watermark signature.

19. The method of claim 14, wherein providing the weights to the another device comprises providing the weights in scrambled form in response to the confidence score falling below the threshold.

20. The method of claim 19, wherein providing the weights to the another device in scrambled form degrades performance of the another device in using the machine learning model.

21. A system comprising:
a processing unit; and
a memory storing software instructions that, when executed by the processing unit, cause the processing unit to:
receive a machine learning model, wherein the machine learning model comprises a plurality of layers comprising multiple convolutional neural network (CNN) weights;
replace one or more bits in multiple ones of the plurality of layers with bits of a watermark, the replaced bits selected to decrease the accuracy of the machine learning model;
scramble at least some bits in the layers so as to decrease the accuracy of the machine learning model;
compare a test signature associated with the watermark with a watermark signature;
unscramble the at least some bits in response to the comparison; and
use the machine learning model after it unscrambles the at least some bits.

22. The system of claim 21, wherein the memory stores software instructions that, when executed by the processing unit, cause the processing unit to:
refrain from unscrambling the at least some bits in response to the comparison; and
use the machine learning model after it refrains from unscrambling the at least some bits.

* * * * *